United States Patent
De Perini

(10) Patent No.: US 8,272,292 B2
(45) Date of Patent: Sep. 25, 2012

(54) CONTROL DEVICE FOR A BICYCLE AND BICYCLE COMPRISING SAME

(75) Inventor: Bruno De Perini, Montecchio Maggiore-VI (IT)

(73) Assignee: Campagnolo S.r.l., Vicenza (IT)

( * ) Notice: Subject to any disclaimer, the term of this patent is extended or adjusted under 35 U.S.C. 154(b) by 680 days.

(21) Appl. No.: 12/039,835

(22) Filed: Feb. 29, 2008

(65) Prior Publication Data

US 2008/0210043 A1   Sep. 4, 2008

(30) Foreign Application Priority Data

Mar. 1, 2007  (IT) .............................. MI2007A0399

(51) Int. Cl.
*F16C 1/10*  (2006.01)
(52) U.S. Cl. ...................................... 74/502.2
(58) Field of Classification Search ................. 74/501.6, 74/502.2; 200/331, 332; 280/63
See application file for complete search history.

(56) References Cited

U.S. PATENT DOCUMENTS

| | | | |
|---|---|---|---|
| 3,707,609 A | 12/1972 | Dapot et al. | |
| 4,029,916 A | 6/1977 | Chu | |
| 5,313,546 A | 5/1994 | Toffetti | 385/135 |
| 5,470,277 A | 11/1995 | Romano | |
| 5,479,776 A | 1/1996 | Romano | |
| 5,865,454 A * | 2/1999 | Campagnolo | 280/238 |
| 6,216,078 B1 | 4/2001 | Jinbo | 701/70 |
| 6,619,154 B2 | 9/2003 | Campagnolo | 74/502.2 |
| 6,698,567 B2 * | 3/2004 | Dal Pra' | 192/217 |
| 7,017,440 B2 | 3/2006 | Campagnolo | |
| 7,080,723 B2 * | 7/2006 | Uno et al. | 192/217 |
| 2001/0053724 A1 | 12/2001 | Campagnolo | |
| 2004/0089092 A1 | 5/2004 | Campagnolo | |
| 2008/0210041 A1 * | 9/2008 | Dal Pra' et al. | 74/502.2 |
| 2008/0210043 A1 | 9/2008 | De Perini | |
| 2008/0210044 A1 * | 9/2008 | De Perini | 74/502.2 |
| 2008/0210045 A1 * | 9/2008 | De Perini et al. | 74/502.2 |
| 2008/0210046 A1 * | 9/2008 | De Perini | 74/502.2 |

FOREIGN PATENT DOCUMENTS

| | | |
|---|---|---|
| AU | 6754581 | 9/1982 |
| AU | 6754581 A | 9/1982 |
| CN | 1327930 A | 12/2001 |
| CN | 1621302 A | 6/2005 |
| EP | 0 853 036 | 7/1998 |
| EP | 0 878 383 | 11/1998 |

(Continued)

OTHER PUBLICATIONS

European Search Report for EP Appl. No. 08003757.5—dated Jul. 25, 2011.

(Continued)

*Primary Examiner* — Vicky Johnson
(74) *Attorney, Agent, or Firm* — Volpe and Koenig, P.C.

(57) ABSTRACT

A control device (1) for providing at least one electrical-electronic command to at least one bicycle component is provided, with a support body (2) carrying at least one switch (46), a respective actuation element (24) and a respective manual actuation member (10), with a transmission mechanism (13, 20) arranged between the manual actuation member (10) and the actuation element (24). Through the provision of the transmission mechanism for transmitting the movement of the manual actuation member (10) to the actuation element (24) of the at least one switch (46), the at least one switch (46) can be displaced in an area (2*a*) further inside the control device (2), less exposed to the external environment.

58 Claims, 13 Drawing Sheets

FOREIGN PATENT DOCUMENTS

| | | |
|---|---|---|
| EP | 1 384 660 | 1/2004 |
| EP | 1 264 765 | 7/2004 |
| EP | 1264765 B1 | 7/2004 |
| EP | 1 473 220 | 11/2004 |
| EP | 1 524 179 | 4/2005 |
| EP | 1524179 A2 | 4/2005 |
| EP | 1 535 830 | 6/2005 |
| EP | 1535830 A2 | 6/2005 |
| EP | 1 642 823 | 4/2006 |
| EP | 1642823 A2 | 4/2006 |
| FR | 2654698 | 5/1991 |
| JP | 06012941 | 1/1994 |
| JP | 9 271 132 | 10/1997 |
| JP | 10316073 | 12/1998 |
| JP | 2000108981 | 4/2000 |
| JP | 2002019675 | 1/2002 |
| JP | 2003072570 | 3/2003 |
| JP | 2005153865 | 6/2005 |

OTHER PUBLICATIONS

Chinese Office Action and English translation issued Feb. 22, 2012.
Japanese Office Action for Appln. No. 2008-048981, dated Jun. 5, 2012 with English Translation.

* cited by examiner

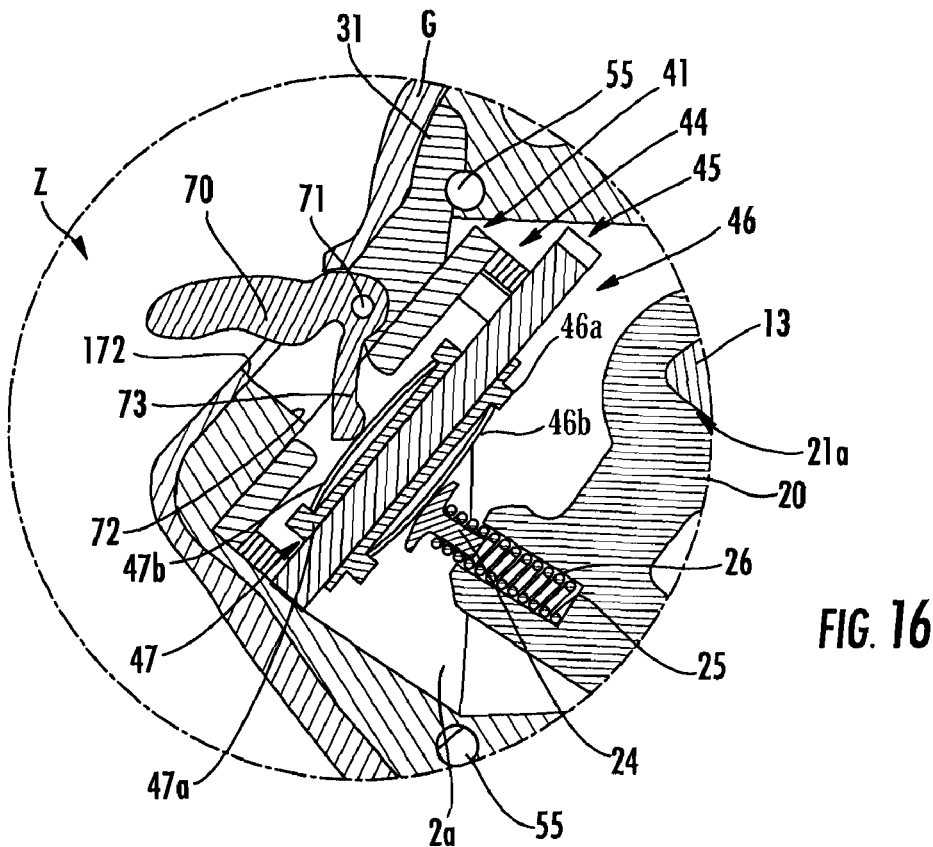
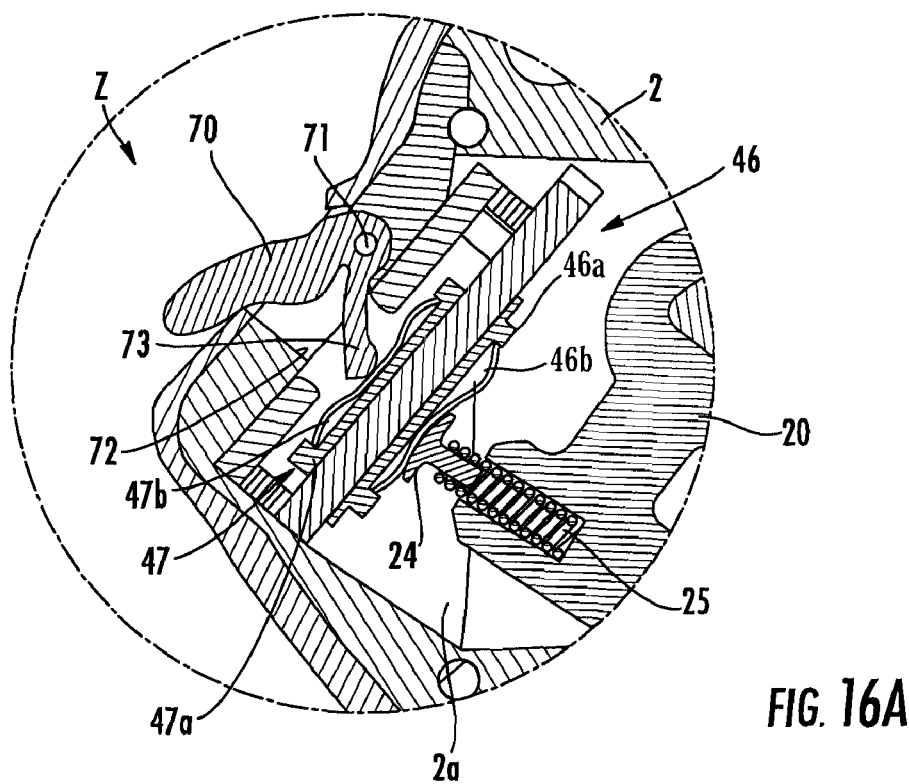
FIG. 16
FIG. 16A

CONTROL DEVICE FOR A BICYCLE AND BICYCLE COMPRISING SAME

FIELD OF INVENTION

The present invention relates to a control device for a bicycle, as well as to a bicycle comprising such a control device.

BACKGROUND

Known control devices for a bicycle generally comprise a support body suitable for attachment at a handgrip portion of the handlebars and carrying one or more manual actuation members, of the lever type and actuated with a rotary movement, or of the button type and actuated with a linear movement, by one or more fingers to provide commands to bicycle components, such as a brake, a derailleur or a cyclecomputer.

SUMMARY

The invention concerns a control device for a bicycle for providing at least one electrical-electronic command to at least one bicycle component, comprising a support body, at least one switch, a respective actuation element and a respective manual actuation member. A transmission mechanism is arranged between the manual actuation member and the actuation element.

BRIEF DESCRIPTION OF THE DRAWINGS

Further features and advantages of the present invention shall become clearer from the following detailed description of some preferred embodiments thereof, made with reference to the attached drawings. In the drawings:

FIG. 16 shows a detail corresponding to FIG. 10, but with an alternative embodiment of manual actuation member and associated actuation element for a switch;

FIG. 16a shows the detail of FIG. 16 in a different operating condition; and

DETAILED DESCRIPTION OF THE PREFERRED EMBODIMENTS

Introduction to the Embodiments

Figure 1:
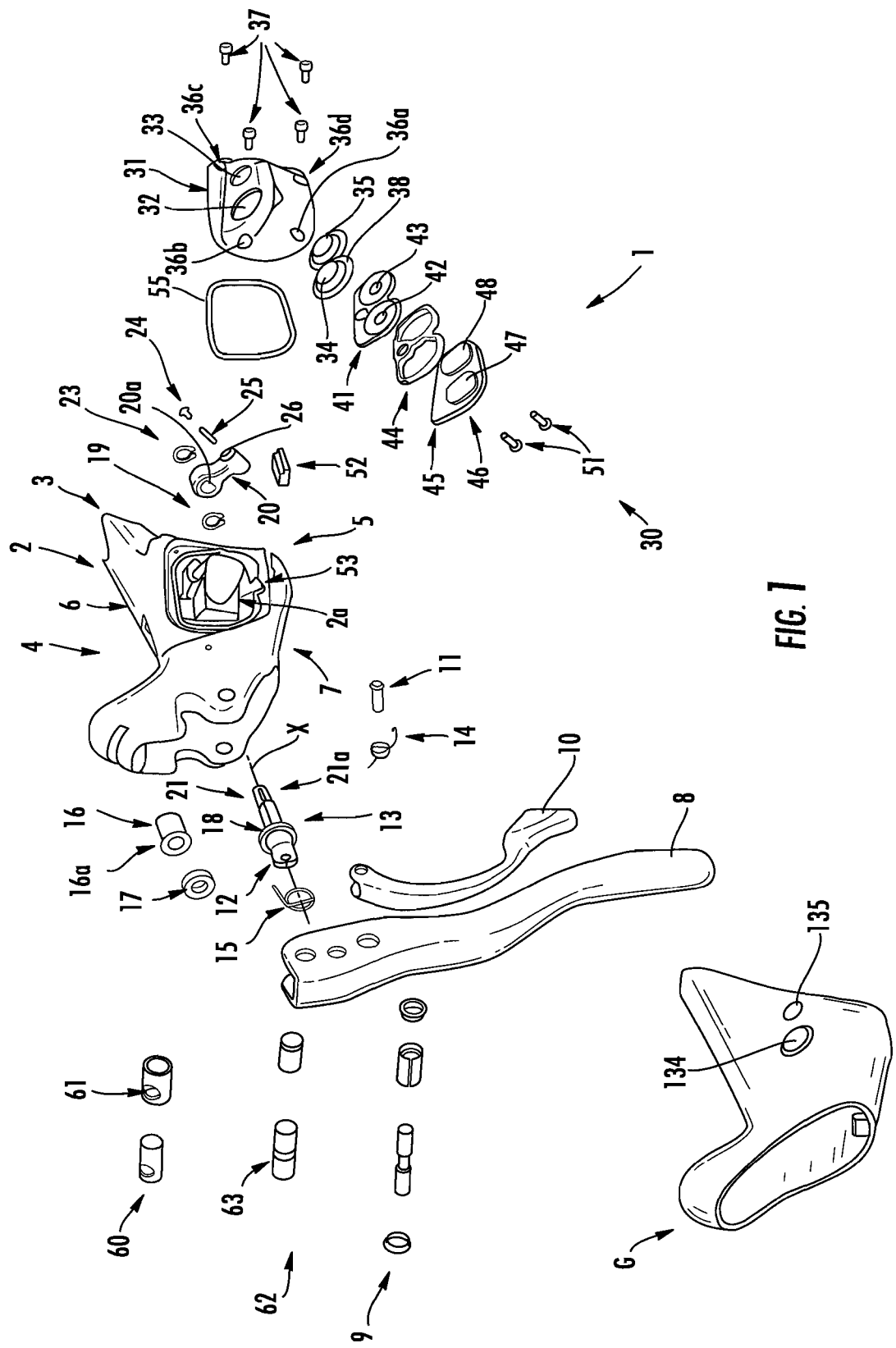
FIG. 1 shows an exploded isometric view of an embodiment of a control device for a bicycle according to the invention.

The invention concerns a control device for a bicycle for providing at least one electrical-electronic command to at least one bicycle component, comprising a support body, at least one switch, a respective actuation element and a respective manual actuation member. A transmission mechanism is arranged between the manual actuation member and the actuation element.

Through the provision of the transmission mechanism for transmitting the movement of the manual actuation member to the actuation element of the switch, the switch can be displaced in an area further inside the control device, less exposed to the external environment.

Preferably, said manual actuation member is a separate piece from said transmission mechanism.

Preferably said transmission mechanism comprises a shaft rotatably supported in the support body, said manual actuation member being associated with a first end of said shaft, and said shaft having a transversal protrusion at a second end.

More preferably, the transversal protrusion comprises a hammer force fitted or shape fitted onto the rotation shaft in a predetermined angular position with respect to the manual actuation member.

The provision of a transversal protrusion not integral with the rotation shaft allows the assembly operations of the control device to be made easier.

Preferably, the actuation element of the switch and the switch are housed in an inner cavity of the support body, and said shaft extends in a hole of said support body communicating with said inner cavity.

More preferably, the inner cavity is tightly sealed.

The tightness of the inner cavity further protects the switch from the external environment and thus further increases the reliability of the control device.

Even more preferably, the shaft is rotatably supported in the support body through a cylindrical anti-friction bushing.

Preferably, the bushing has an end flange, the rotation shaft has an annular shoulder close to the first end, and a sealing ring is arranged between the end flange and the shoulder.

Preferably, a return element is operatively arranged between the rotation shaft and the support body for biasing the manual actuation member towards a rest position wherein said switch is not actuated.

In this way, unidirectional manual actuation is sufficient to provide the electrical-electronic command.

Preferably, in the rest position of the manual actuation member, the actuation element is in contact with or in close proximity of the switch.

In this way, the switch is not biased in the rest position of the manual actuation member.

Preferably, the at least one manual actuation member comprises a lever.

The support body is preferably suitable for attachment at a handgrip portion of curved handlebars.

In this case, preferably the at least one manual actuation member comprises a lever projecting frontally downwards from the support body.

Preferably, the lever is hinged to the transmission mechanism to be suitable for a rotary movement not interacting with the switch.

In this way it is possible to house the lever, in particular a gearshifting lever, behind and adjacent to a brake lever of the control device, since the switch actuation lever is able to follow the movement of the brake lever.

Preferably, said control device further comprises at least one further manual actuation member for providing at least one mechanical command to a bicycle component.

More preferably, the support body is suitable for front attachment to a curved handgrip portion of handlebars, the at least one manual actuation member comprises a lever, and the at least one further manual actuation member comprises a further lever projecting frontally downwards from the support body, the lever projecting downwards from the support body behind the further lever.

Preferably, the further lever is hinged to the support body about a first axis, and the lever is hinged to the transmission mechanism about a second axis, to be suitable for a rotary movement independent of the actuation of the switch.

More preferably, the first and second axes are parallel.

As stated above, in this way it is possible to house the lever, in particular a gearshifting lever, behind and adjacent to a brake lever of the control device, since the actuation lever of the switch follows the movement of the brake lever, and actuates the switch independently of such a movement.

Preferably, a return element is arranged between the lever and the transmission mechanism for biasing the lever toward a rest position adjacent to the further lever.

In this way, upon the release of the further lever, in particular the brake lever, the lever for providing the electrical-electronic command, in particular a gearshifting lever, and the brake lever itself automatically return to the rest position.

Preferably, the manual actuation member has a predetermined stroke.

More preferably, this predetermined stroke is determined by the contact of the lever against an edge of the further lever.

Preferably, the actuation element is of the elastic type.

The provision of an elastic actuation element of a switch allows the tactile feeling caused by the change in state of the switch to be increased since the actuation element compresses during the initial phase of the actuation and then, at the moment when the switch changes state, the elastic actuation element decompresses following the mobile part of the switch.

Preferably, the at least one switch comprises a diaphragm with substantially sudden deformation.

Preferably, the elastic actuation element comprises a helical spring.

More preferably, the elastic actuation element further comprises a small actuation pin extending inside the helical spring.

The small actuation pin allows the abrasion on the mobile part of the switch, in particular the abrasion on the diaphragm, to be kept at low values.

Preferably, the at least one bicycle component is selected from the group consisting of an electromechanical derailleur or a cyclecomputer.

Preferably, moreover, the mechanical bicycle component, where provided for, comprises a mechanical derailleur and/or a mechanical brake.

Preferably, the switch is removably fixed to a carrier removable from the support body.

In another aspect thereof, the invention relates to a bicycle comprising a control device as stated above.

Detailed Description

The figures illustrate an embodiment of a control device 1 for a bicycle according to the invention.

The control device 1 is a right-hand control device, i.e. intended to be associated with the right side of a bicycle's handlebars. A control device intended to be associated with the left side of the handlebars shall substantially mirror the right one.

The control device 1 comprises a support body 2 suitable for front attachment to a curved handgrip portion of a bicycle's handlebars, at the rear 3 thereof, and frontally projecting from the handlebars to be grippable by the cyclist. The attachment takes place through any connector, such as a clip, a clamp, a band, a tie, etc.

The support body 2 comprises, in general, with spatial reference to the condition mounted on the handlebars, an outer or distal side surface 4, an inner or proximal side surface 5, a top surface 6, and a bottom surface 7.

In order for the user to enter commands, the illustrated control device 1 comprises a plurality of manual actuation members, in this case a first mechanical control lever 8 and a second lever 10 and a pair of buttons 34, 35 for activating three electric switches.

Preferably, the first lever 8 is for a brake's actuation, the second lever 10 is for a derailleur's actuation in one direction, preferably towards a toothed wheel of greater diameter (upward gearshifting), and the buttons 34, 35 are for the derailleur's actuation in a second direction, preferably towards gear wheels of smaller diameter (downward gearshifting), and for inputting commands into a cyclecomputer. In the case illustrated, an integrated control device is therefore described. Reference shall be made to such a preferred configuration hereinafter.

The first lever 8 is pivoted about a pin 9 to the support body 2.

A pin 60 is pivoted to the first lever 8 and has a seat 61 for receiving a head of a brake cable.

A brake release mechanism 62, comprises a pin 63 with two operating conditions, which interacts with the support body 2 to tension or detension the brake cable.

The second lever 10 is arranged behind the first lever 8, and is pivoted about a pin 11 parallel to the pivot pin 9 of the first lever 8, so that the second lever 10 can follow the movement of the first lever 8.

More specifically, the second lever 10 is pivoted about the pin 11 to an end 12 of a shaft 13 having a longitudinal axis X substantially transversal to the axes of the pins 9 and 11, and rotationally supported in the support body 2 as better described below.

A first return spring 14 is arranged between the second lever 10 and the rotation shaft 13 to keep the second lever 10 biased, with respect to the rotation about the pin 11, towards a rest position behind and adjacent to the first lever 8.

A second return spring 15 is operatively arranged between the rotation shaft 13 and the support body 2 to keep both the rotation shaft 13 and the second lever 10 pivoted thereto biased towards a rest position with respect to the rotation about the axis X.

Figure 7:
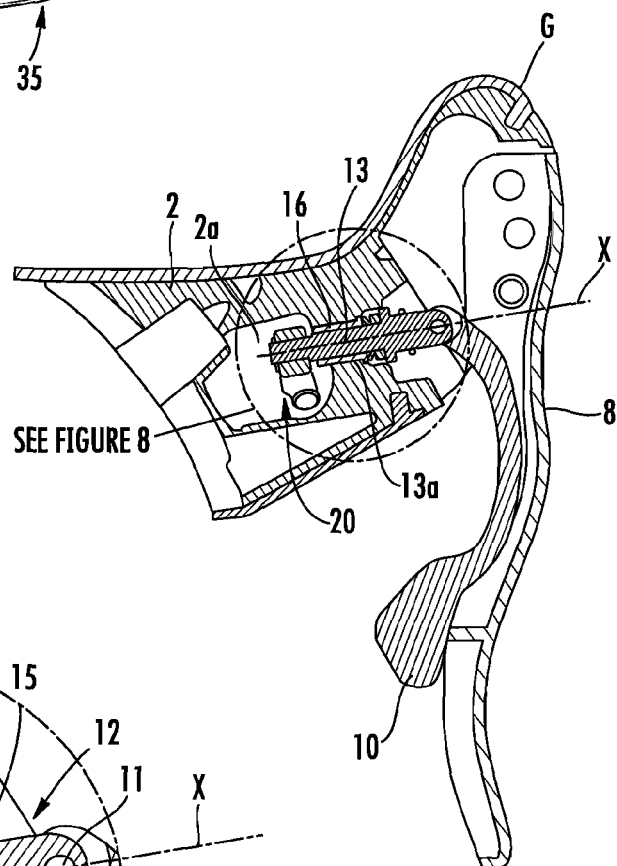
FIG. 7 shows a section view along plane VII-VII of FIG. 6.
Figure 8:
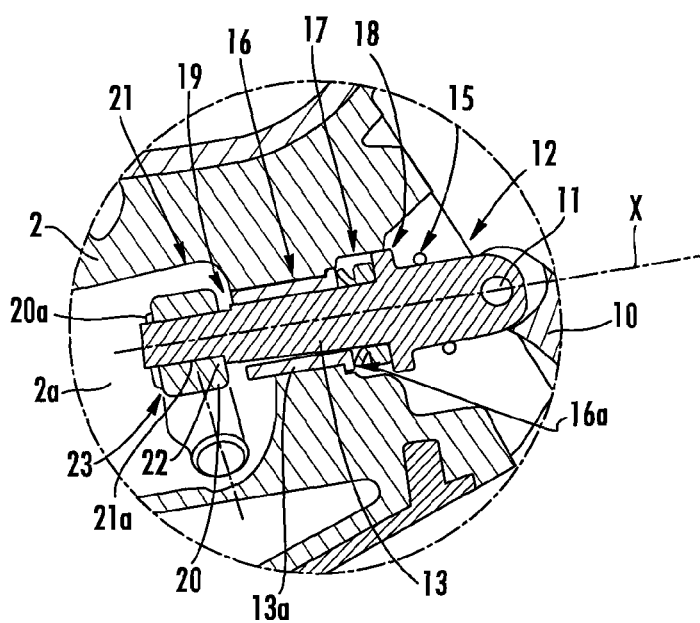
FIG. 8 shows a magnified view of a detail of FIG. 7.
Figure 9:
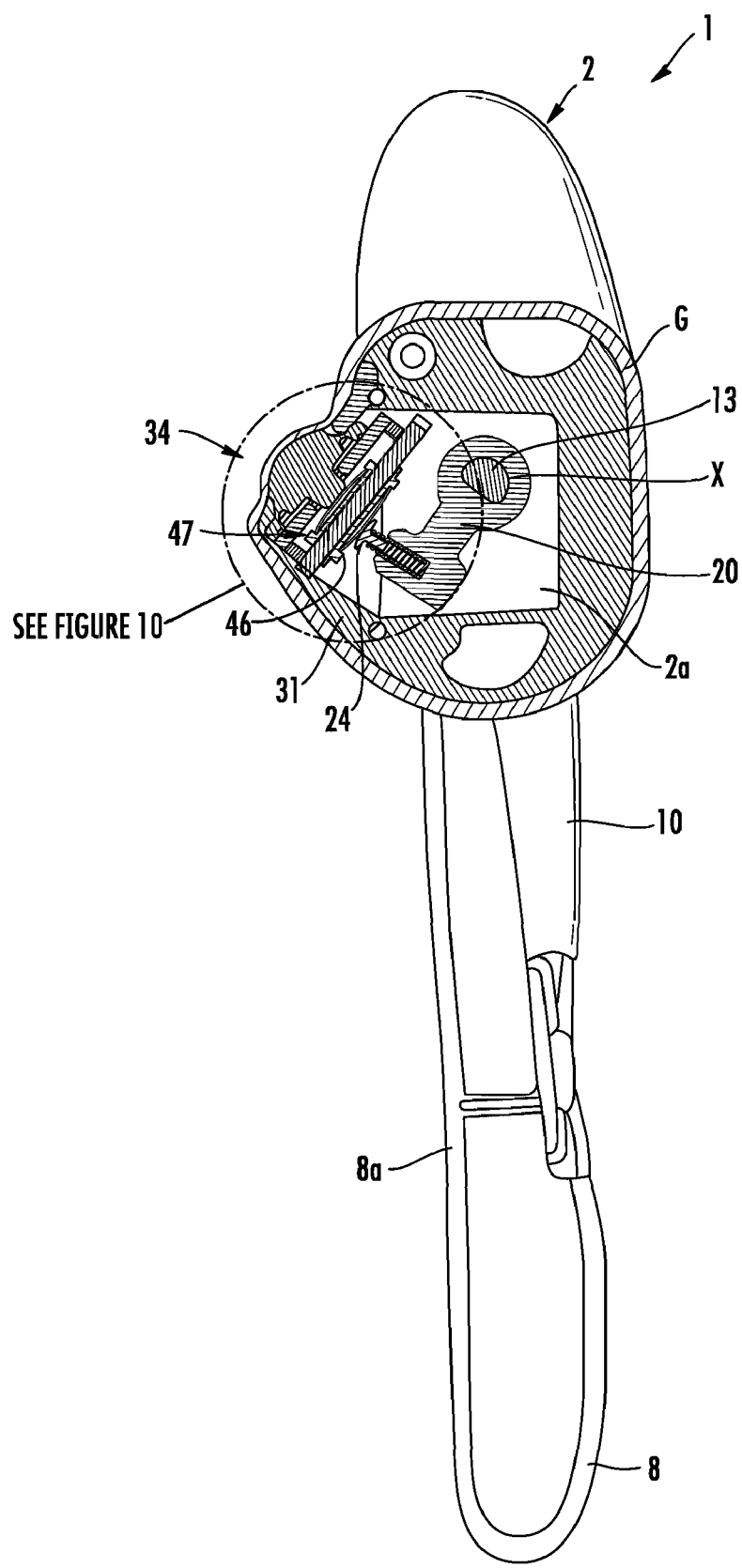
FIG. 9 shows a section view along plane IX-IX of FIG. 4.

As can be seen more clearly in FIGS. 7 and 8, the rotation shaft 13 is supported in a hole 13a communicating with an inner cavity 2a of the support body 2, through a cylindrical anti-friction bushing 16 having an end flange 16a.

A sealing ring 17 (V-ring) is arranged between the end flange 16a of the bushing and an annular shoulder 18 formed on the outer surface of the rotation shaft 13. The annular shoulder 18, through the V-ring 17, axially and elastically locks the rotation shaft 13 in a first direction with respect to the bushing 16 and therefore to the support body 2.

The provision of the bushing 16 and the sealing ring 17 provides a tight seal between the second lever 10, exposed to the external environment, and the inner cavity 2*a* of the control device 2.

A first Seeger ring 19 is housed in a peripheral groove of the rotation shaft 13 to axially lock the rotation shaft 13 with respect to the bushing 16 and therefore to the support body 2 in the opposite direction.

A hammer 20 is force fitted or shape fitted to an end 21 of the rotation shaft 13 opposite the end 12 on which the second lever 10 is pivoted, within the cavity 2*a* of the support body 2.

The hammer 20 is force fitted or shape fitted onto the rotation shaft 13 in a predetermined angular position with respect to the second lever 10, through the provision of a flattened surface 21*a* of the end 21 of the shaft 13 and a correspondingly shaped hole 20*a* of the hammer 20.

The hammer 20 is axially locked to the rotation shaft 13 between an undercut 22 defined by the flattened surface 21*a* of the rotation shaft 13 on one side, and a second Seeger ring 23 on the other.

A small actuation pin 24 having a mushroom shape is mounted on the free end of the hammer 20 through the interposition of a helical spring 25 arranged in a cavity 26 of the hammer 20.

More specifically, the shank of the small actuation pin 24 is inserted inside the helical spring 25.

The small actuation pin 24 is intended to actuate a first switch 46, as better explained hereinafter.

The control device 1 comprises a switch unit 30 partially received inside the cavity 2*a* of the support body 2.

The switch unit 30 comprises said first switch 46 actuated through the second lever 10, a second switch 47 and a third switch 48, and the two buttons 34, associated with the second and third switches 47, 48 for the cyclist to input commands.

Figure 2:
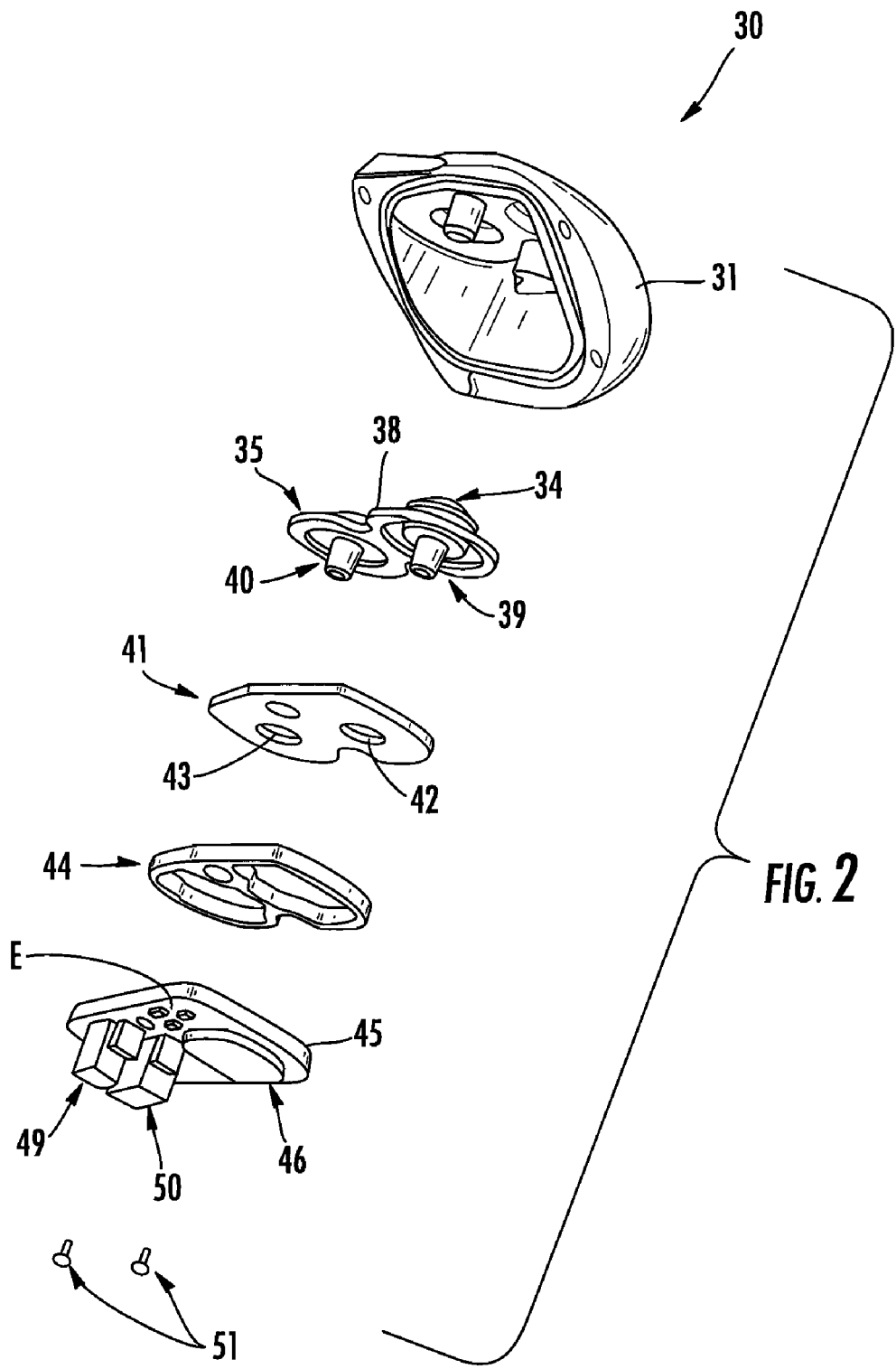
FIG. 2 shows an isometric view of some parts of the device of FIG. 1.
Figure 3:
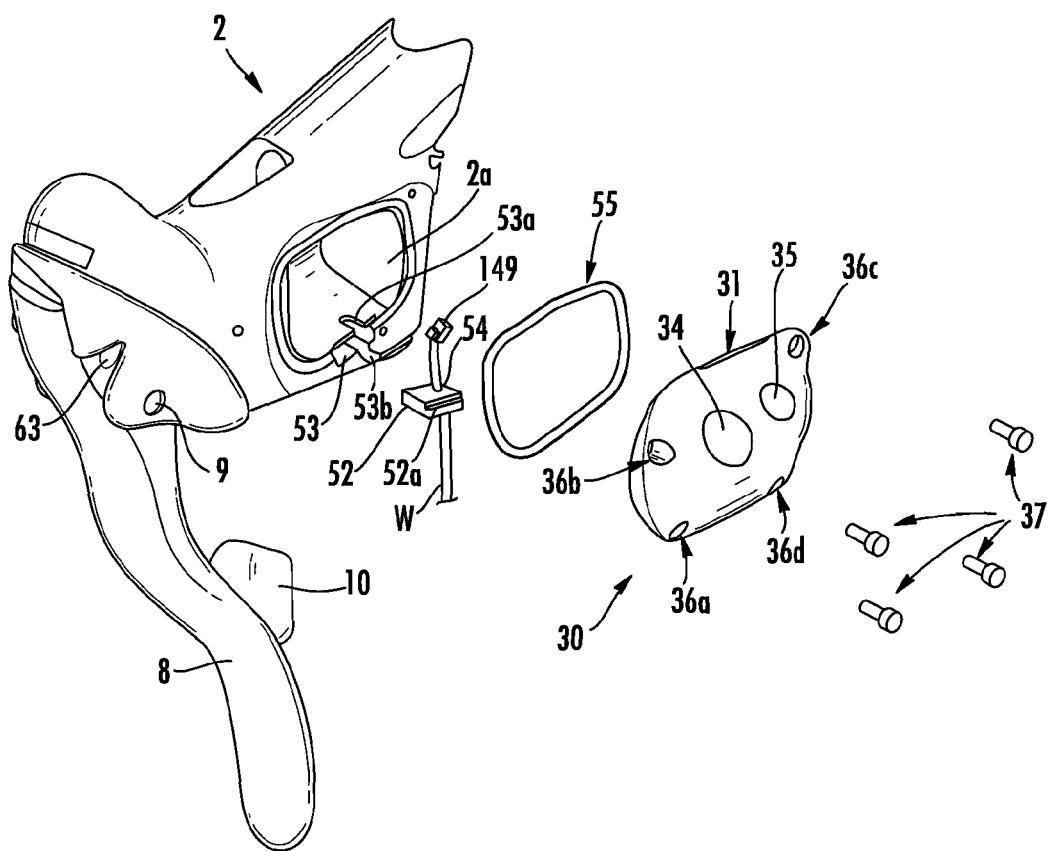
FIG. 3 shows a partially exploded isometric view of the control device of FIG. 1, without covering sheath.
Figure 4:
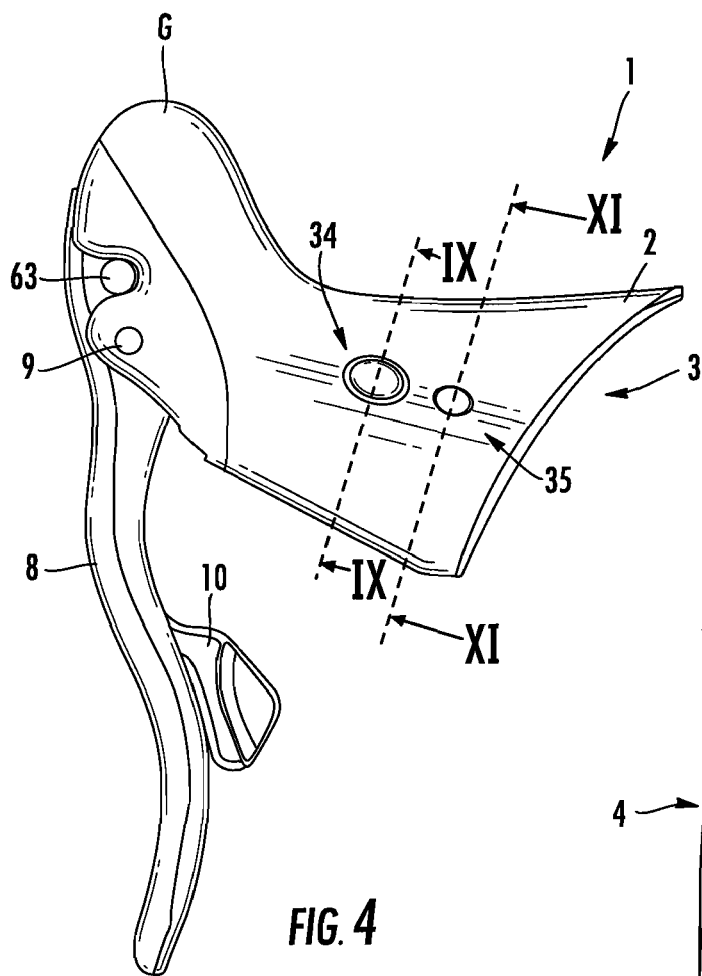
FIG. 4 shows a side view of the control device of FIG. 1 assembled.
Figure 5:
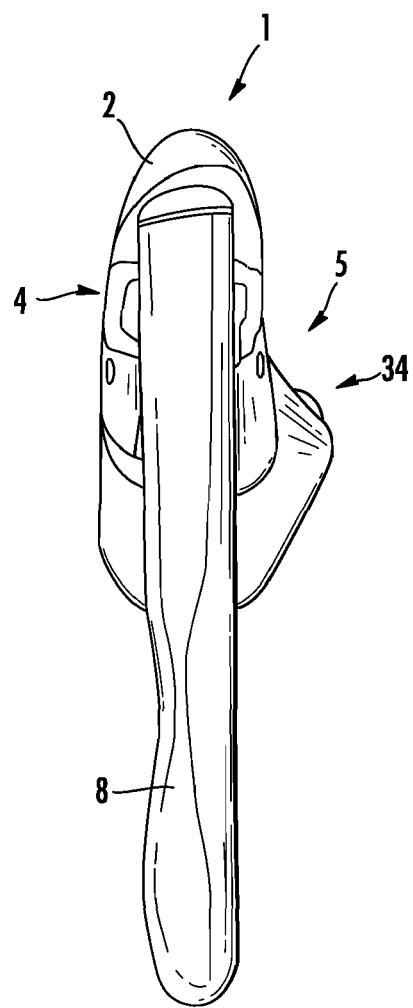
FIG. 5 shows a front view of the control device of FIG. 1 assembled.
Figure 6:
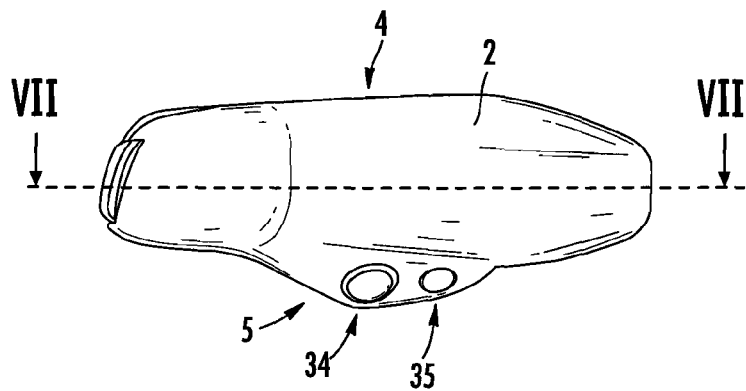
FIG. 6 shows a view from above of the control device of FIG. 1 assembled.

More specifically, the switch unit 30 comprises a support board 45 provided with the first switch 46 on a first side (FIG. 2) and with the second 47 and third 48 switches on the other side (FIG. 1).

The switches 46, 47 and 48 are of the known type, for example switches of the ED Domes type of ITT Industries, Inc., White Plains, N.Y., U.S.A.

Figure 10:
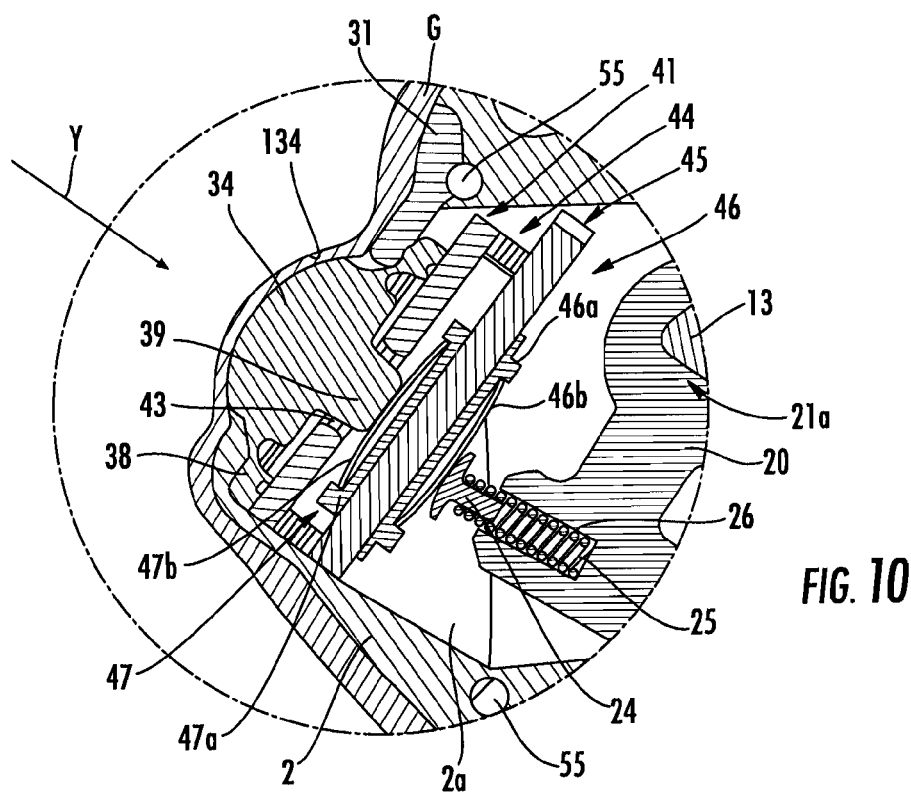
FIG. 10 shows a magnified view of a detail of FIG. 9.
Figure 10A:
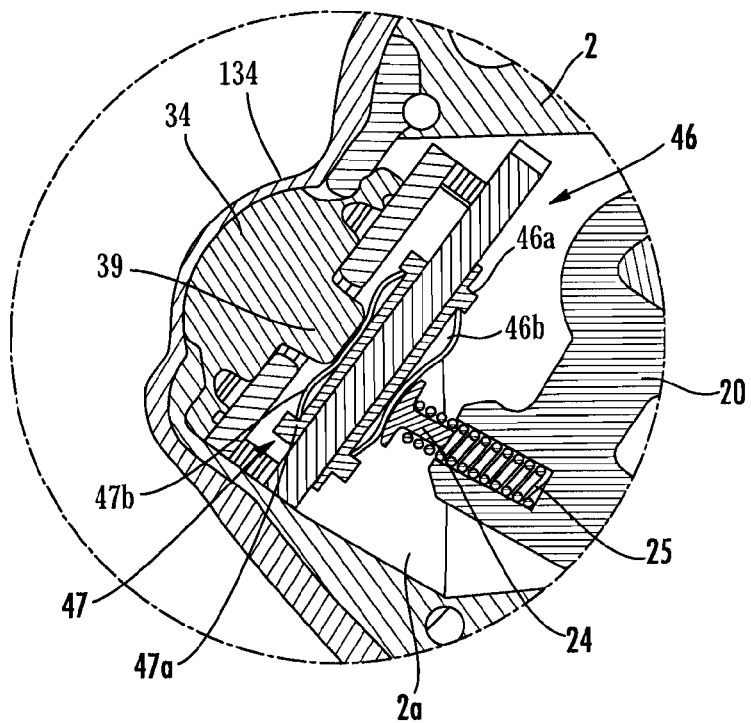
FIG. 10a shows the detail of FIG. 10 in a different operating condition.
Figure 11:
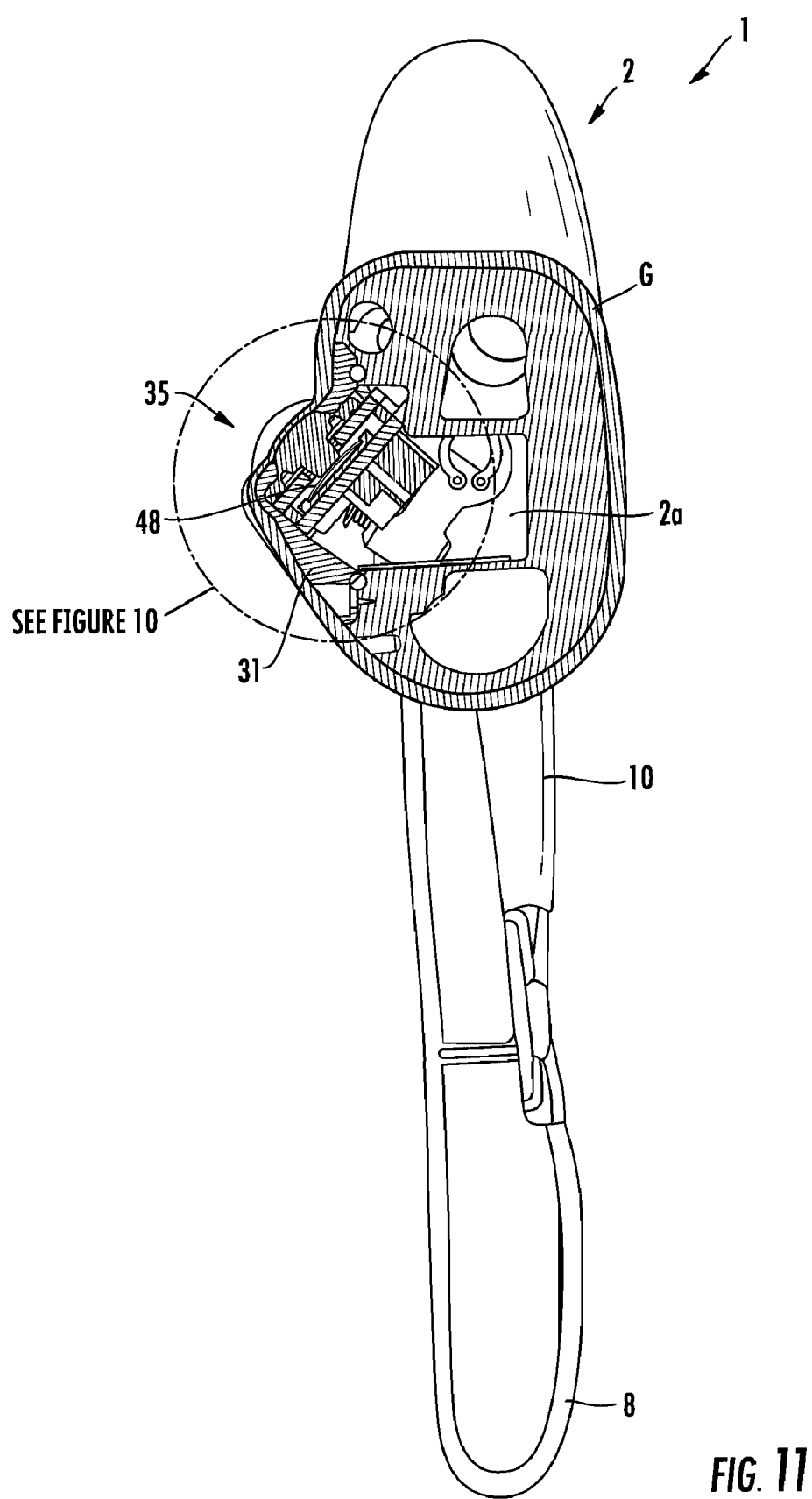
FIG. 11 shows a section view along plane XI-XI of FIG. 4.
Figure 12:
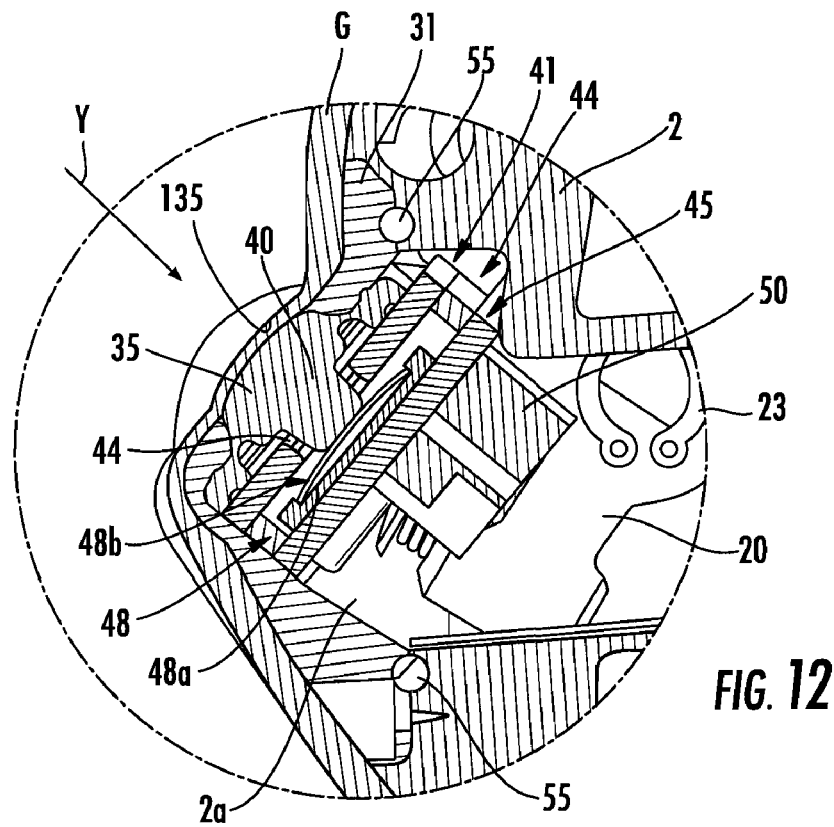
FIG. 12 shows a magnified view of a detail of FIG. 11.
Figure 12A:
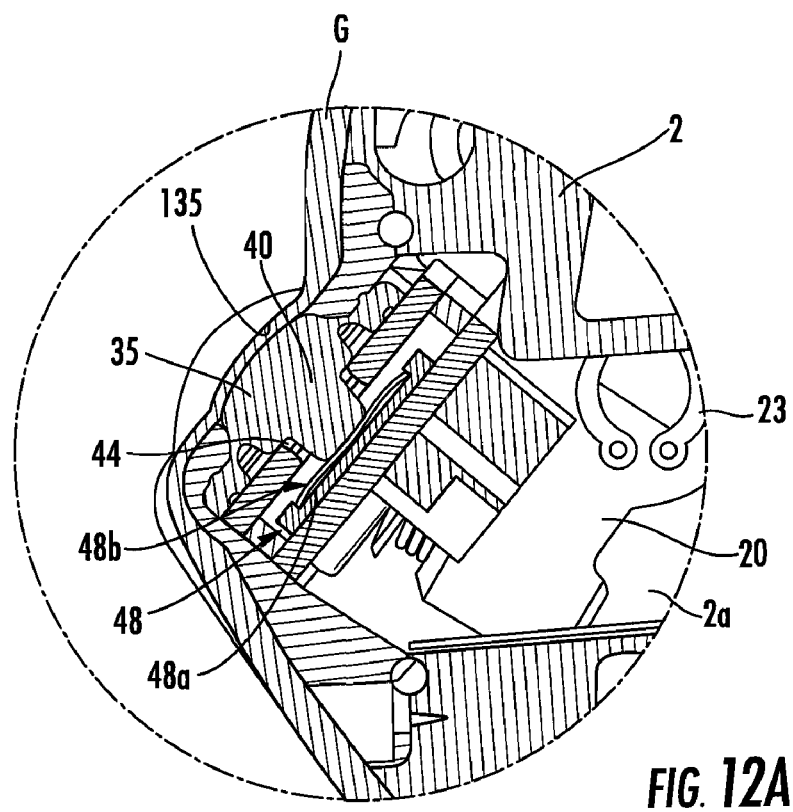
FIG. 12a shows the detail of FIG. 12 in a different operating condition.

As can be seen more clearly in FIGS. 10*a* and 12*a*, such switches 46, 47 and 48 each consist of two diaphragms, a bottom one 46*a*, 47*a* and 48*a* and a top one 46*b*, 47*b* and 48*b*, electrically insulated from each other in the stable state of the switch by an insulating for example thermoplastic, support, and by an air gap.

The two diaphragms 46*a*, 47*a*, 48*a* and 46*b*, 47*b*, 48*b* are electrically connected to the two terminals of the switch.

The top diaphragm 46*b*, 47*b*, 48*b* has an elasticity and dome-shape such that, when subject to a pressure, it substantially instantaneously collapses, thus establishing a contact with the bottom diaphragm 46*a*, 47*a*, 48*a*, therefore closing the switch 46, 47, 48.

The first and second buttons 34, 35 are preferably made on a common elastic membrane 38, for example through co-moulding.

Each button 34, 35 of the switch unit 30 is provided with an elastic actuation shank 39, 40.

The actuation shank 39, 40 is for example made of a silicone-like rubber of Shore A hardness 30.

The switch unit 30 further comprises a first rigid intermediate element 41 provided with two guide holes 42, 43 for the actuation shanks 39, 40 of the buttons 34, 35, and a second rigid intermediate spacer element 44, which can be combined into a single rigid element, arranged between the buttons 34, 35 and the switch support board 45.

The switch unit 30 further comprises a concave cover 31, suitable for receiving the elastic membrane 38 carrying the switches 34, 35, the intermediate elements 41, 44 and the support board 45 carrying the switches.

The cover 31 of the switch unit 30 is provided with two holes 32, 33 for receiving the two buttons 34, 35.

Through two screws 51, the support board 45 is fixable to the cover 31 to mutually fix the aforementioned components in position to form the switch unit 30.

The components of the switch unit 30 are so sized that, in the rest condition of the buttons 34, 35, the actuation shank 39, 40, respectively, is in contact with the switch 47, 48, respectively, or slightly spaced therefrom.

The cover 31 is further provided with four holes 36*a*-36*d* for receiving screws 37 for fixing the switch unit 30 to the support body 2.

A gasket 55 is arranged between the cover 31 and the support body 2.

The switch unit 30, the cavity 2*a* of the support body 2 and the hammer 20 are so sized that, in the rest condition of the second lever 10, the small actuation pin 24 is in contact with the switch 46, or slightly spaced therefrom.

In the illustrated embodiment of the control device 1, the communication to the bicycle component of the command signals generated through the actuation of the switches 46, 47, 48 takes place via a cable.

More specifically, the support board 45 carries, on the side facing the cavity 2*a* of the support body 2, a pair of connectors 49, 50 for connection through matching connectors to respective electric cables. In the figures, a single electric cable W equipped with a connector 149 is shown.

The electric cable W is arranged passing inside a hole 54 of a sealing element 52.

The support body 2 has a cavity 53 with a shape substantially matching the sealing element 52.

More specifically, the cavity 53 of the support body 2 is substantially parallelepiped, but slightly flared.

Preferably, the cavity 53 is slightly smaller in size than the sealing element 52.

The cavity 53 communicates with the cavity 2*a* and with the outside of the support body 2 through two respective notches 53*a* and 53*b* suitable for the passage of the electric cable W.

Figure 13:
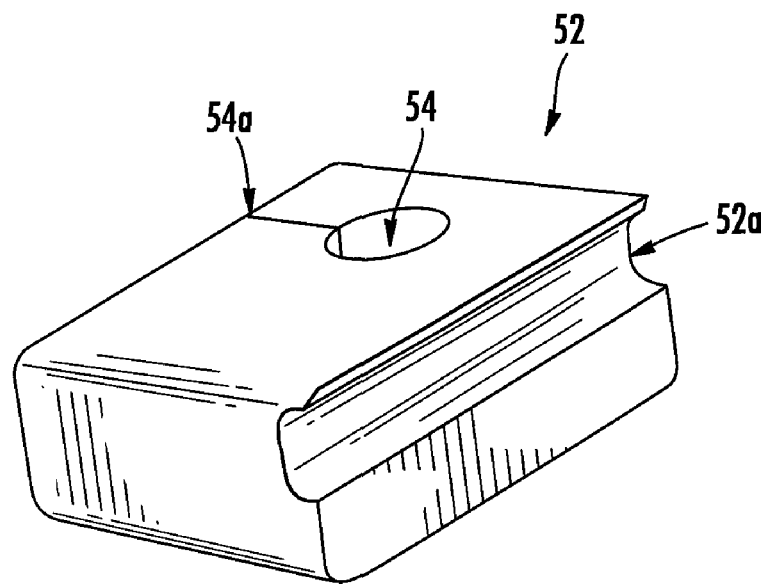
FIG. 13 shows a magnified view of a detail of FIG. 1.

The sealing element 52, more clearly shown in FIG. 13, is substantially parallelepiped, but slightly tapered.

The sealing element 52 is made of a deformable material, for example rubber.

The hole 54 of the sealing element 52 is slightly smaller in size than the electric cable W.

The sealing element 52 also has a notch 54*a* extending from the hole 54 to the outer surface for the passage of the electric cable W, which can however be omitted.

The sealing element 52 further has a transversal groove 52*a* suitable for receiving a portion of the gasket 55 arranged between the support body 2 and the switch unit 30.

The control device 1 is coated with a covering sheath G.

The covering sheath G of the control device 1 has, proximate the buttons 34, 35, areas 134, 135 having such characteristics of deformability as to allow each button 34, 35 to be pushed until the associated switch 47, 48 is actuated.

For connection of the control device 1 to the bicycle, the electric cable W is first inserted into the hole 54 of the sealing element 52 through the notch 54*a*.

The sealing element 52 is then inserted inside the cavity 53, passing the electric cable W from the side provided with the connector 149 into the cavity 2a of the support body 2 through the notch 53a and, from the other side, towards the outside of the control device 1 through the notch 53b.

The electric cable W, from the side provided with the connector 149, is passed inside the gasket 55 and fixed to the connector 49 of the switch unit 30.

The switch unit 30 is then fixed to the support body 2 with the interposition of the gasket 55, which pushes upon the transversal groove 52a of the sealing element 52.

Finally, the sheath G is slipped onto the control device 2.

The characteristic of deformability and the external size of the sealing element 52 slightly larger than the size of the cavity 53 make a tight seal between the outer surfaces of the sealing element 52 and the inner surfaces of the cavity 53.

Moreover, the characteristic of deformability of the sealing element 52, along with the size of the hole 54 slightly smaller than the diameter of the electric cable W, makes a tight seal between the electric cable W and the inner surface of the hole 54.

Figure 13A:
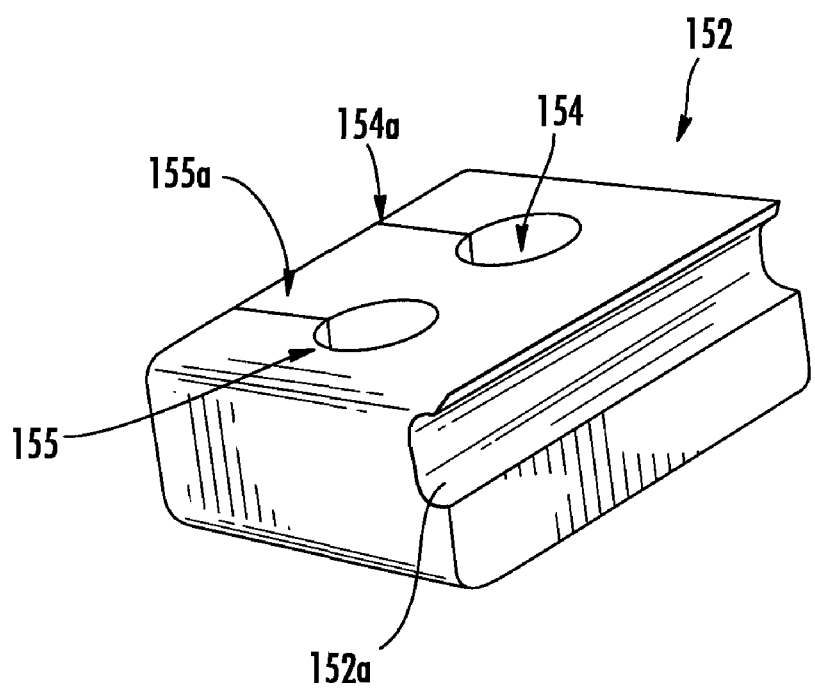
FIG. 13a shows a different embodiment of the detail of FIG. 13.
Figure 14:
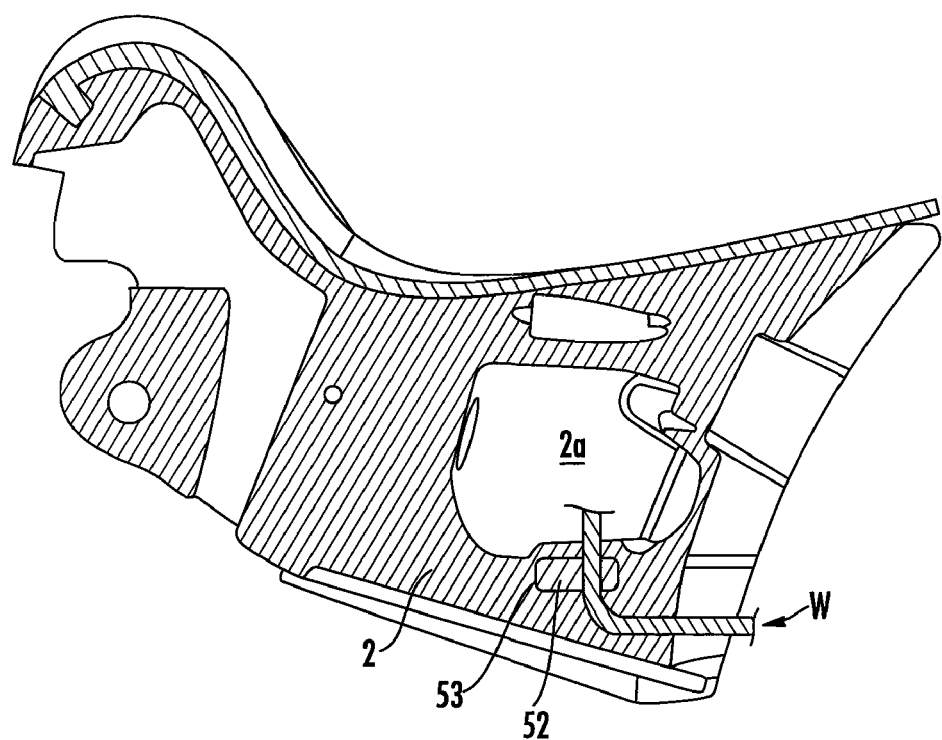
FIG. 14 shows a first section view of the assembled control of the invention showing the detail of FIG. 13.
Figure 15:
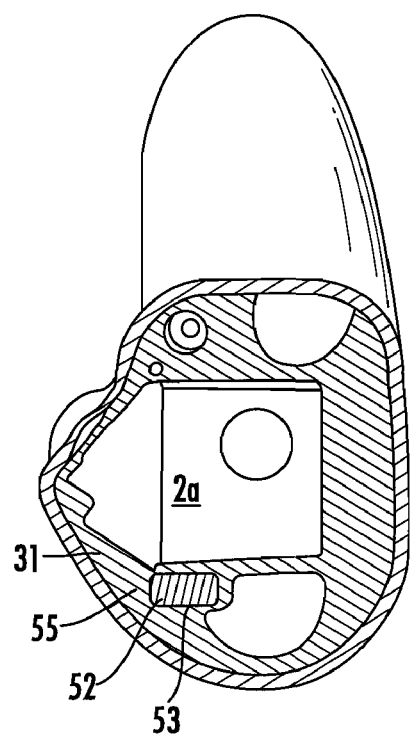
FIG. 15 shows a second section view of the assembled control of the invention showing the detail of FIG. 13.

FIG. 13a shows an embodiment of a sealing element 152 provided for also receiving a second electric cable, for example connected to the second connector 50 of the support board 45. The sealing element 152 has a pair of holes 154 and 155, a transversal groove 152a, and preferably a pair of notches 154a and 155a extending from the holes 154 and 155.

In the case of use of the sealing element 152 and of two electric cables, the cavity 53 of the support body shall communicate with the cavity 2a and with the outside of the support body 2 through two respective pairs of notches suitable for the passage of the electric cables.

In the illustrated embodiment, the electric cable W is of the bipolar type, and the support board 45 carries components E for managing the switches 46, 47, 48.

The components E for managing the switches 46, 47, 48, preferably discrete components, are suitable for changing the electrical resistance between two terminals of the connector 49, according to the open or closed state of each of the switches 46, 47, 48.

Figure 17:
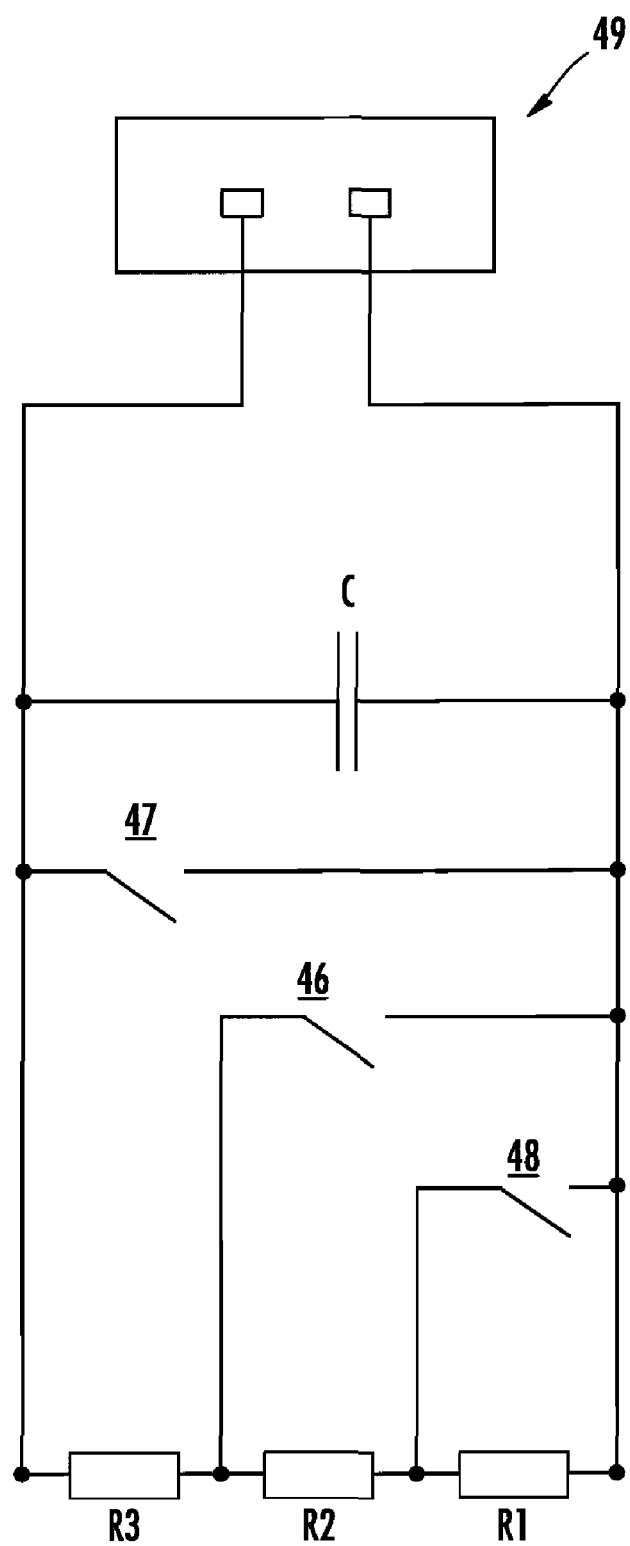
FIG. 17 shows an electrical diagram of the control device of FIG. 1.

More specifically, as shown in FIG. 17, a capacitor C and, in parallel with the capacitor C, a series of three resistors R1, R2, R3 are connected between the two terminals of the connector 49.

One of the switches, preferably the downward gearshifting switch 47, is also connected between the two terminals of the connector 49, in parallel with capacitor C and with the series of resistors R1, R2, R3.

Another of the switches, preferably the upward gearshifting switch 46, is connected between a first of the terminals of the connector 49 and the node between the resistors R2 and R3.

The third switch, preferably the switch 48 for inputting commands into the cyclecomputer, is connected between the first of the terminals of the connector 49 and the node between the resistors R1 and R2.

The operation of the control device 1 shall now be described.

The pulling of the first lever 8 towards the handlebars about the pin 9 causes the traction of the head of the brake cable housed in the seat 61 of the pin 60, in a per se known manner. The second lever 10 follows the movement of the first lever rotating about the pin 11.

As stated above, when the second lever 10 is in the rest position, the actuation element 24, 25 associated with the hammer 20 rests on or is proximity of the top diaphragm 46b of the switch 46, which is spaced and electrically insulated from the bottom diaphragm 46a of the switch 46 (FIG. 10).

Pushing the second lever 10 in the proximal direction, namely in the direction towards the middle plane of the handlebars, causes the rotation of the rotation shaft 13 about the axis X, and therefore the rotation of the hammer 20 within the cavity 2a of the support body 2.

The helical spring 25 housed in the hammer 20 compresses and the small actuation pin 24 starts to exert a pressure onto the top diaphragm 46b of the switch 46.

At the moment when the top diaphragm 46b collapses and gets deformed towards the bottom diaphragm 46a of the switch 46, the helical spring 25 decompresses following, together with the small actuation pin 24, the top diaphragm 46b in its deformation (FIG. 10a).

During the actuation of the switch 46, a continuous physical contact is maintained along the path between the top diaphragm 46b, the actuation element 24, the helical spring 25, the hammer 20, the rotation shaft 13, the second lever 10, and the cyclist's finger.

In this way the tactile feeling caused by the deformation of the top diaphragm 46b, typical of the switch 46, is transferred and felt by the cyclist's finger resting upon the second lever 10, to a greater extent than the case in which, in the absence of the helical spring 25, the physical contact is lost at the moment of collapse of the top diaphragm 46b of the switch 46.

The small actuation pin 24 allows the abrasion of the top diaphragm 46b to be kept low compared with the possible abrasive effect that the helical spring 25 would have if it rested directly on the top diaphragm 46b.

The end of stroke of the second lever 10 is determined by the contact of the second lever 10 against the edge 8a of the first lever 8.

The rotation of the second lever 10 about axis X is also possible during the actuation of the brake lever 8.

As stated above, when each of the buttons 34, 35 is in the rest position, the actuation shank 39, 40 rests upon or is in proximity of the top diaphragm 47b, 48b of the switch 47, 48, which is spaced and electrically insulated from the bottom diaphragm 47a, 48a of the switch 47, 48 (FIG. 10, 12).

When the cyclist pushes the button 34, 35 towards the support body 2, the provision of the elastic membrane 38, the guide hole 43, 44 of the first intermediate element 41 and the spacer element 44 allows the button 34, 35 and the related actuation shank 39, 40 to move along an actuation direction Y substantially perpendicular to the plane defined by the support board 45.

Therefore, when the cyclist pushes the button 34, 35 towards the support body 2, the elastic membrane 38 in the area adjacent to the button 34, 35 gets deformed allowing the displacement of the button 34, 35 and of its actuation shank 39, 40 against the switch 47, 48.

The actuation shank 39, 40, due to its elasticity, compresses and starts to exert a pressure onto the top diaphragm 47b, 48b of the switch 47, 48.

At the moment when the top diaphragm 47b, 48b collapses and gets deformed towards the bottom diaphragm 47a, 48a, the actuation shank 39, 40 decompresses following the top diaphragm 47b, 48b in its deformation (FIG. 10a, 12a).

During the actuation of the switch 47, 48, a continuous physical contact is maintained along the path between the top diaphragm 47b, 48b, the button 34, 35, the yielding area 134, 135 of the sheath G, and the cyclist's finger.

Thus, the tactile feeling caused by the deformation of the top diaphragm 47b, 48b, typical of the switch 47, 48, is transferred and felt by the cyclist's finger resting upon the button 34, 35, to a greater extent than the case in which, if the actuation shank 39, 40 were not elastic, the physical contact would be lost at the moment of collapse of the top diaphragm 47b, 48b of the switch 47, 48.

FIGS. 16 and 16a illustrate an alternative embodiment of components for actuating the switch 47, which alternatively or additionally can also be used for the switch 48.

A lever 70 is hinged about a pin 71 to the cover 31 of the switch unit 30, at a hole 72 of the cover and at a hole 172 of the sheath G.

The lever 70 integrally rotates and is preferably integrally made with an actuation element 73 of the switch 47, which is at an angle with respect to the lever 70.

The actuation element 73 is a yielding shank.

When the lever 70 is in rest position, the actuation shank 73 rests upon or is in proximity of the top diaphragm 47b of the switch 47, which is spaced and electrically insulated from the bottom diaphragm 47a of the switch 47 (FIG. 16).

When the cyclist pushes the lever 70 towards the support body 2 in direction Z, the yielding actuation shank 73 is pushed about the pin 71 against the switch 47.

The actuation shank 73, due to its elasticity, compresses and starts to exert a pressure upon the top diaphragm 47b of the switch 47.

At the moment when the top diaphragm 47b collapses and gets deformed towards the bottom diaphragm 47a, the actuation shank 73 decompresses following the top diaphragm 47b in its deformation (FIG. 16a).

Also in this case, during the actuation of the switch 47, a continuous physical contact is maintained along the path between the top diaphragm 47b, the lever 70 and the cyclist's finger. This increases the tactile feeling caused by the deformation of the top diaphragm 47b.

The actuation of one of the switches 46, 47 and 48 is transmitted to a bicycle component through the electronics E and the electric cable W.

More specifically, with reference to FIG. 17, when none of the switches 46, 47, 48 are actuated, the resistance between the terminals of the connector 49 is the sum of the resistances of resistors R1, R2 and R3. When the switch 47 is actuated, the terminals of the connector 49 are short-circuited. When the switch 46 is actuated, the resistance between the terminals of the connector 49 is equal to the resistance of resistor R3. When the switch 48 is actuated, the resistance between the terminals of the connector 49 is equal to the sum of the resistances of resistors R2 and R3.

FIG. 10a represents the simultaneous actuation of the switches 46, 47 merely for illustrative purposes.

However, in the case of simultaneous actuation of two or more of the switches 46, 47, 48, the signal corresponding to the actuation of the switch 47 (zero resistance between the terminals of the connector 49) shall prevail over both of the signals generated by the actuation of the switches 46 and 48. The signal generated by the actuation of the switch 46 (resistance between the terminals of the connector 49 equal to that of R3) shall prevail over the signal generated by the actuation of the switch 48. In this way, in the preferred embodiment, the actuation of the gearshift shall prevail over the simultaneous sending of commands to the cyclecomputer, and input of a downward gearshifting signal by the cyclist shall prevail over the simultaneous input of an upward gearshifting signal by the cyclist.

Those skilled in the art shall understand that several changes, additions, replacements or omissions of parts can be made to the embodiment described above, without departing from the scope of the invention, some of which are presented hereinafter.

The control device can have more or fewer manual actuation members such as the buttons 32, 33 and the levers 10, 70, for activating more or fewer switches such as the switches 46, 47, 48, even only one.

For example, the second lever 10 can be omitted, a button or a lever for controlling gearshifting in one direction and a button or a lever for controlling gearshifting in the opposite direction being provided in the control unit 30, as an alternative or in addition to one or more buttons or one or more levers for managing the cyclecomputer.

The switches can be provided, as an alternative or in addition to what has been described above, also to enter distinct commands into a cyclecomputer.

The connectors 49, 50 of the control unit 30 can be replaced by a single multipolar connector, by a single bipolar connector, or they can be omitted, one or more electric cables being fixedly connected to the support board 45, for example soldered.

The components E for managing the switches 46, 47, 48 can be integrated components.

The cable(s) W, with the related sealing element 52, 152 and the related seat 53 in the support body 2, can be omitted should the communication of the command signals entered through the control device 2 and the electric or electromechanical devices of the bicycle, such as a derailleur, a cyclecomputer or a brake, take place in wireless mode, for example at radio frequency, in this case an autonomous power supply source, such as a battery, being provided inside the control device 2.

In the case of communication via cable, the electronic components E for differentiating among the signals generated by the three switches 46, 47, 48 can be changed with respect to the embodiment described and illustrated above with reference to FIG. 16.

Moreover, the electronic components E for differentiating among the signals generated by the three switches 46, 47, 48 can be omitted, three pairs of wires of the cable W, or of more than one cable, being provided, each directly interrupted by a respective switch 46, 47, 48.

The cable(s) W can directly lead to the controlled component, or to a common control unit for the various bicycle components.

Alternatively, the control device 2 can also comprise the electronics for controlling the bicycle components.

Still alternatively, the switches 46, 47, 48 can be arranged directly within a power circuit to control an electromechanical device of the bicycle, for example to directly control the actuation of an electric motor of a derailleur or of a brake.

The provision of an independent switch unit 30, removable from the support body 2 as described above, can also be used with a control lever, such as the second lever 10, which directly actuates an associated switch, such as the switch 46, namely without the interposition of the transmission mechanism comprising the rotation shaft 13 and the hammer 20.

In the absence of the first switch 46, the chamber 2a can be omitted, non-tight or replaced with a recess.

In this case, a gasket can be provided between the support board 45 and the cover 31, as an alternative to the gasket 55.

Moreover, a cavity for housing the sealing element 52 or 152, similar to the cavity 53, can be made in the cover 31 or partially in the cover 31 and partially in the support body 2.

The provision of the transmission mechanism between the second lever 10 and the actuation element 24, 25 of the respective switch 46 may also be advantageous in the absence of an independent switch unit 30, removable from the support body 2, since it still allows the switch 46 to be arranged in a less exposed position of the control device 2.

In the motion transmission mechanism between the second lever 10 and the actuation element 24, 25 of the switch 46, the hammer 20 can be a transversal protrusion integrally made with the rotation shaft 13.

Moreover, the rotation shaft 13 can be rotationally supported in the support body 2 by different means from the anti-friction bushing 16, for example by a roller or ball bearing.

The switches 46, 47, 48 can alternatively be of the normally closed type.

Moreover, the switches 46, 47, 48 can be different from the diaphragm type. In the case of switches in which the switching of state takes place through the snapping of a mobile element it is in any case advantageous to provided for an elastic actuation element as described above.

Moreover, the switch 46 can be directly actuated by the helical spring 25, the small actuation pin 24 being omitted, or by a different elastic element, such as a small actuation pin made of an elastic material.

Similarly, the actuation shank 39, 40, 73 of the buttons 34, 35 or of the lever 70 can be replaced by a different elastic element, for example a helical spring possibly associated with a small actuation pin, similarly to the actuation elements 24, 25 of the switch 46.

Furthermore, the switch 46 can be directly actuated by the hammer 20, the helical spring 25 and the small actuation pin 24 being omitted, even if at the expenses of the transmission of the tactile feeling to the cyclist.

Similarly, the switches 47, 48 can be actuated by non-elastic actuation elements 39, 40, 73, even if at the expenses of the transmission of the tactile feeling to the cyclist.

The actuation shank 73 can not be integrally made with the actuation lever 70, provided that the two in any case are made to rotate as a unit about the pin 71.

The provision of actuation elements 24, 25 and 39, 40, 73 of the switches 46, 47, 48 of an elastic type may however be advantageous even independently of the insertion of the switches 46, 47, 48 themselves in an independent switch unit 30 removable from the support body 2, and/or independently of the provision of the transmission mechanism between the second lever 10 and the respective switch 46.

When one does not wish to exploit the elasticity of an actuation element, a rigid button can be used directly on the switch, in the absence of a distinct actuation element.

The return springs 14, 15, as well as the elasticity of the common membrane 38, can be replaced by different return elements.

In the embodiment of FIG. 16, a return spring can be operatively arranged between the lever 70 and the cover 31 to keep the lever 70 biased towards a rest position with respect to rotation about the pin 71.

Moreover, in this embodiment the rigid intermediate elements 41 and 44 of the switch unit 30 can be omitted.

The control device 1 can be shaped for attachment to straight bicycle handlebars.

The first lever 8 can be omitted, as well as there can be other manual actuation members for providing respective mechanical commands to one or more bicycle components.

The articulation pins 9, 11 of the levers 8, 10 can be arranged in a non-parallel orientation to each other.

What is claimed is:

1. A control device for a bicycle for providing at least one electrical-electronic command to at least one bicycle component, comprising a support body, at least one switch, a respective actuation element and a respective manual actuation member, wherein a transmission mechanism is arranged between said manual actuation member and said actuation element, the transmission mechanism extends through a wall of the support body, said manual actuation member being associated with a first end of said transmission mechanism, and said actuation element being associated with a second end of said transmission mechanism opposite said first end.

2. Control device according to claim 1, wherein said manual actuation member is a piece separate from said transmission mechanism.

3. Control device according to claim 1, wherein said transmission mechanism comprises a shaft rotatably supported in the support body, said manual actuation member being associated with a first end of said shaft, and said shaft having a transversal protrusion at a second end.

4. Control device according to claim 3, wherein the transversal protrusion comprises a hammer force fitted or shape fitted onto the rotation shaft in a predetermined angular position with respect to the manual actuation member.

5. Control device according to claim 3, wherein the actuation element of the at least one switch and the at least one switch are housed in an inner cavity of the support body, and said shaft extends in a hole of said support body communicating with said inner cavity.

6. Control device according to claim 5, wherein the inner cavity is sealed.

7. Control device according to claim 3, wherein the shaft is rotatably supported in the support body through a cylindrical anti-friction bushing.

8. Control device according to claim 7, wherein the bushing has an end flange, the rotation shaft has an annular shoulder proximate the first end, and a sealing ring is arranged between the end flange and the shoulder.

9. Control device according to claim 3, wherein a return element is operatively arranged between the rotation shaft and the support body for biasing the manual actuation member towards a rest position wherein said at least one switch is not actuated.

10. Control device according to claim 9, wherein in the rest position of the manual actuation member, the actuation element is proximate the at least one switch.

11. Control device according to claim 9, wherein in the rest position of the manual actuation member, the actuation element contacts the at least one switch.

12. Control device according to claim 1, wherein said at least one manual actuation member comprises a lever.

13. Control device according to claim 12, wherein the lever is hinged to the transmission mechanism and is capable of a rotary movement that does not interact with said at least one switch.

14. Control device according to claim 1, wherein the support body is suitable for attachment at a handgrip portion of curved handlebars.

15. Control device according to claim 14, wherein said manual actuation member comprises a lever projecting frontally downwards from the support body.

16. Control device according to claim 1, wherein said control device further comprises at least one further manual actuation member for providing at least one mechanical command to a bicycle component.

17. Control device according to claim 16, wherein the mechanical bicycle component comprises at least one of a mechanical derailleur or a mechanical brake.

18. Control device according to claim 16, wherein said support body is suitable for front attachment to a grip portion of curved handlebars, said manual actuation member comprises a lever, and said at least one further manual actuation member comprises a further lever projecting frontally downwards from the support body, said lever projecting downwards from the support body behind said further lever.

19. Control device according to claim 18, wherein said manual actuation member has a predetermined stroke which is determined by the contact of the lever against an edge of the further lever.

20. Control device according to claim 18, wherein the further lever is hinged to the support body about a first axis, and the lever is hinged to the transmission mechanism about a second axis, to be suitable for a rotary movement independent of the actuation of said at least one switch.

21. Control device according to claim 20, wherein the first and the second axis are parallel.

22. Control device according to claim 20, wherein a return element is arranged between the lever and the transmission mechanism for biasing the lever toward a rest position adjacent to the further lever.

23. Control device according to claim 1, wherein said manual actuation member has a predetermined stroke.

24. Control device according to claim 1, wherein said actuation element is an elastic actuation element.

25. Control device according to claim 24, wherein said at least one switch comprises a deformable diaphragm.

26. Control device according to claim 24, wherein the actuation element comprises a helical spring.

27. Control device according to claim 26, wherein said actuation element further comprises an actuation pin extending inside said helical spring.

28. Control device according to claim 1, wherein said at least one bicycle component is selected from the group consisting of an electromechanical derailleur and a cyclecomputer.

29. Control device according to claim 1, wherein said at least one switch is removably fixed to a carrier removable from the support body.

30. A bicycle comprising a control device according to claim 1.

31. An electromechanical control device that controls at least one electronic bicycle component and at least one mechanical bicycle component, the device comprising:
 a support body housing at least one switch in electrical communication with the at least one electronic bicycle component, the switch actuatable by an actuation element,
 a first manual actuation member,
 a mechanical transmission arranged between the first manual actuation member and the actuation element, and
 a second manual actuation member that controls the at least one mechanical bicycle component,
 wherein the mechanical transmission extends through a wall of the support body, said first manual actuation member is associated with a first end of said mechanical transmission, and said actuation element is associated with a second end of said mechanical transmission opposite said first end.

32. The electromechanical control device of claim 31, wherein the first manual actuation member is separate from the mechanical transmission, the transmission comprising a shaft, rotatably supported in the support body, the first manual actuation member coupled to a first end of the shaft, and the shaft having a transversal protrusion at a second end, the transversal protrusion comprising a hammer force fitted or shape fitted onto the rotation shaft at a predetermined angular position with respect to the manual actuation member.

33. The electromechanical control device of claim 31, wherein the at least one switch and the respective actuation element are housed in an inner cavity of the support body, the inner cavity being sealed from an exterior of the support body, and the shaft extends in an opening of the support body that is in communication with the inner cavity and is rotatably supported in the support body by a cylindrical anti-friction bushing.

34. The electromechanical control device of claim 33, wherein the bushing has an end flange, the shaft has an annular shoulder proximate the first end, and a sealing ring arranged between the end flange and the shoulder.

35. The electromechanical control device of claim 31, further comprising a return element, operatively arranged between the rotation shaft and the support body, and that biases the manual actuation member towards a rest position, wherein in the rest position of the manual actuation member, the actuation element is proximate the at least one switch and the at least one switch is not actuated.

36. The electromechanical control device of claim 31, wherein the first and second manual actuation members comprise first and second levers, respectively.

37. The electromechanical control device of claim 36, wherein the support body is attached to a handgrip portion of curved handlebar and the levers project frontally downwards from the support body.

38. The electromechanical control device of claim 37, wherein:
 the second lever is hinged to the support body about a first axis, and
 the first lever
  projects downwards from the support body behind the second lever,
  is hinged to the transmission mechanism about a second axis that is parallel to the first axis, and
  is capable of a rotary movement independent of the actuation of the at least one switch.

39. The electromechanical control device of claim 38, further comprising a return element, operatively arranged between the first lever and the transmission mechanism, which biases the first lever towards a rest position adjacent to the second lever, wherein the first manual actuation member has a predetermined stroke which is determined by the contact of the first lever against an edge of the second lever.

40. The electromechanical control device of claim 36, wherein the first lever is hinged to the transmission mechanism and is capable of a rotary movement without actuating the at least one switch.

41. The electromechanical control device of claim 31, wherein the first manual actuation member has a predetermined stroke.

42. The electromechanical control device of claim 31, wherein
 the at least one electronic bicycle component is at least one of an electromechanical derailleur or a cyclecomputer, and
 the mechanical bicycle component is at least one of a mechanical derailleur or a mechanical brake.

43. The electromechanical control device of claim 31, wherein:
 the at least one switch comprises a deformable diaphragm, and
 the actuation element is elastic and comprises a helical spring and an actuation pin, and the spring wraps around the pin.

44. The control electromechanical device of claim 31, wherein the at least one switch is removably fixed to a carrier that is removable from the support body.

45. A bicycle comprising the electromechanical control device of claim 31.

46. An electromechanical control device that controls at least one electronic bicycle component and at least one mechanical bicycle component, the device comprising:
a support body having a sealed inner cavity that houses at least one switch in electrical communication with the at least one electronic bicycle component, the switch actuatable by an actuation element,
a shaft,
a first manual actuation member coupled to a first end of the shaft,
the shaft extends in an opening of the support body that is in communication with the inner cavity and is rotatably supported in the support body by a cylindrical anti-friction bushing and further comprises a transversal protrusion at a second end, the transversal protrusion comprising a hammer force fitted or shape fitted onto the second end at a predetermined angular position with respect to the manual actuation member, and
a second manual actuation member that controls the at least one mechanical bicycle component, the second manual actuation member being operatively connected to the support body.

47. The electromechanical control device of claim 46, wherein the bushing has an end flange, the shaft has an annular shoulder proximate the first end, and the device further comprises a sealing ring arranged between the end flange and the shoulder.

48. The electromechanical control device of claim 46, further comprising a return element, operatively arranged between the rotation shaft and the support body, that biases the manual actuation member towards a rest position in which the at least one switch is not actuated.

49. The electromechanical control device of claim 48, wherein in the rest position of the manual actuation member, the actuation element is proximate the at least one switch.

50. The electromechanical control device of claim 46, wherein the first and second manual actuation members comprise first and second levers, respectively.

51. The electromechanical control device of claim 50, wherein:
the support body is attachable to a handgrip portion of a curved handlebar and the levers project frontally downwards from the support body,
the first lever projects downwards from the support body behind the second lever, the second lever is hinged to the support body about a first axis, and the first lever is hinged to the first end of the shaft about a second axis parallel to the first axis, the first lever being capable of rotating independently of the actuation of the at least one switch.

52. The electromechanical control device of claim 51, further comprising a return element, arranged between the lever and the shaft, which biases the first lever towards a rest position adjacent to the second lever.

53. The electromechanical control device of claim 52, wherein the first lever has a predetermined stroke which is determined by the contact of the first lever against an edge of the second lever.

54. The electromechanical control device of claim 46, wherein the first manual actuation member has a predetermined stroke.

55. The electromechanical control device of claim 46, wherein the at least one electronic bicycle component is at least one of an electromechanical derailleur or a cyclecomputer and the mechanical bicycle component is at least one of a mechanical derailleur or a mechanical brake.

56. The electromechanical control device of claim 46, wherein the at least one switch comprises a deformable diaphragm, and the actuation element is elastic and comprises a helical spring and an actuation pin, wherein the spring wraps around the pin.

57. The electromechanical control device of claim 46, wherein the at least one switch is removably fixed to a carrier that is removable from the support body.

58. A bicycle comprising a control device of claim 46.

* * * * *

UNITED STATES PATENT AND TRADEMARK OFFICE
CERTIFICATE OF CORRECTION

PATENT NO. : 8,272,292 B2
APPLICATION NO. : 12/039835
DATED : September 25, 2012
INVENTOR(S) : Bruno De Perini It is certified that error appears in the above-identified patent and that said Letters Patent is hereby corrected as shown below:

ON THE TITLE PAGE

On the Title Page, in item (56), under "FOREIGN PATENT DOCUMENTS",

In Column 2, Line 1, delete "AU 675481 9/1982".

On Page 2, in item (56), under "FOREIGN PATENT DOCUMENTS",

In Column 1, Line 2, delete "EP 1 264 765 7/2004".
In Column 1, Line 5, delete "EP 1 524 179 4/2005".
In Column 1, Line 7, delete "EP 1 535 830 6/2005".
In Column 1, Line 9, delete "EP 1 642 823 4/2006".

IN THE SPECIFICATION

At column 5, line 36, after the number "34", insert therefor --35--.
At column 5, line 64, after the word "of", delete "Shore A hardness 30" and insert therefor --switch unit 30--.

IN THE CLAIMS

In claim 38, at column 14, line 30, after the word "first", delete "lever" and insert therefor --lever,--.
In claim 42, at column 14, line 52, after the word "31", delete "wherein" and insert therefor --wherein:--.
In claim 44, at column 14, line 65, after the word "the", delete "control electromechanical" and insert therefor --electromechanical control--.

Signed and Sealed this
Twenty-ninth Day of October, 2013

Teresa Stanek Rea
*Deputy Director of the United States Patent and Trademark Office*